United States Patent Office 2,901,486
Patented Aug. 25, 1959

2,901,486
NEW QUINUCLIDINES

Cyril A. Grob, Basel, Switzerland, assignor to Ciba Pharmaceutical Products Inc., Summit, N.J.

No Drawing. Application October 5, 1955
Serial No. 538,789

Claims priority, application Switzerland October 8, 1954

13 Claims. (Cl. 260—293)

This invention provides quinuclidines which contain as a substituent in the 3-position a free or functionally converted carboxyl group, especially a carboxylic acid ester group, and also contain a hydrogen atom or a hydroxyl group in the 3-position or a double bond in the 2:3-position, and salts or quaternary compounds thereof. These are new, stable and therapeutically active compounds. They show pronounced sympathomimetic properties which are of practical importance for a therapeutical effect on disturbed peristalsis.

The invention also provides a process for the manufacture of quinuclidines, where in a 3-quinuclidone is additively combined with hydrocyanic acid, if desired, the nitrile group in the resulting compound is converted into a free or functionally converted carboxyl group, and/or, if desired, the hydroxyl group in the 3-position is split off at any stage of the process and, if desired, the double bond in the resulting compound is hydrogenated, and/or, if desired, a base so obtained is converted into a salt or quaternary compound thereof or a salt obtained is converted into the free base.

In carrying out the additive combination of the 3-quinuclidone with hydrocyanic acid it is of advantage to use a salt of hydrocyanic acid, such as its potassium or sodium salt, and to liberate the acid in a weakly acid reaction medium. In this case it is preferable to use a salt of the quinuclidone, such as a hydrohalide thereof, in aqueous solution. The nitrile group may be converted into a free or functionally converted carboxylic acid group in known manner, for example, by hydrolysis or alcoholysis, or by esterification, such as by converting a carboxylic acid so obtained into its acid chloride and reacting the latter with an alcohol, advantageously a lower alcohol, or by acid alcoholysis of the nitrile. At any stage of the process the oxy-compound may be converted by the elimination of water, for example, by means of thionyl chloride, into the corresponding 2:3-unsaturated quinuclidine, and the double bond in the latter compound may be saturated with hydrogen, such as catalytically activated hydrogen, more especially in the presence of a platinum catalyst.

Depending on the manner in which the process is carried out the new compounds are obtained in the form of the free bases or salts thereof. From the salts the bases can be prepared in the usual manner, and the free bases can be converted into salts thereof by known methods. For forming therapeutically useful salts there may be used inorganic acids, for example, hydrohalic acids, sulphuric acids, nitric acid, phosphoric acids, thiocyanic acid, or organic acids, for example, acetic acid, propionic acid, oxalic acid, malonic acid, succinic acid, malic acid, methane sulphonic acid, ethane sulphonic acid, oxyethane sulphonic acid, benzene or toluene sulphonic acid or therapeutically active acids. The new bases may be converted into quaternary ammonium salts by treatment with quaternating agents, for example, by reaction with reactive esters of lower alkanols, for example, alkyl halides, dialkyl sulphates or alkyl esters of organic sulphonic acids, such as toluene sulphonic acid.

The 3-quinuclidones used as starting materials are known or can be made by methods in themselves known.

The new compounds may be used as medicaments, for example, in the form of pharmaceutical preparations, which contain the compound or a salt or quaternary compound thereof in admixture with a pharmaceutical organic or inorganic carrier suitable for enteral, parenteral or topical administration. As carriers there are used substances which do not react with the new compounds, for example, water, gelatine, lactose, starches, magnesium stearate, talc, vegetable oils, benzyl alcohols, gums, polyalkylene glycols, petroleum jelly, cholesterol or other known carriers for medicaments. The pharmaceutical preparations may be made up, for example, in the form of tablets, dragees, salves, creams or in liquid form as solutions, suspensions or emulsions. If desired, they may be sterilised and/or may contain auxiliary substances, such as preserving agents, stabilising agents, wetting agents or emulsifying agents, salts for regulating the osmotic pressure or buffers. They may also contain other therapeutically active substances. The preparations can be made up by the usual methods.

The following examples illustrate the invention:

*Example 1*

A solution of 7.3 grams of potassium cyanide in 22.5 cc. of water is added dropwise in the course of 15 minutes to a solution, cooled with ice, of 18 grams of 3-quinuclidone hydrochloride in 22.5 cc. of water. The crystalline cyanohydrin, which separates out immediately, is stirred for a further hour at 0° C., and is then filtered off and washed with a small amount of ice water. By drying the product there are obtained 16 grams of colourless 3-oxy-3-cyano-quinuclidine melting at 153–155° C. This compound crystallises from dioxane in the form of colourless prisms melting at 159° C. with decomposition. When entirely pure it melts at 172–173° C. (with decomposition) and yields a picrate, which melts at about 133–134° C. with the evolution of gas after being crystallised from isopropanol. The melt resolidifies and finally melts with decomposition at 210–212° C.

A solution of 2 grams of 3-oxy-3-cyano-quinuclidine in 20 cc. of concentrated hydrochloric acid is allowed to stand at 20° C. for about 48 hours, and is then evaporated in vacuo. By crystallising the residue from a mixture of ethanol and ether there are obtained 21.1 grams of the hydrochloride of a mixture of 3-oxy-quinuclidine-3-carboxylic acid in the form of colourless needles melting at 252–255° C. with decomposition.

*Example 2*

9.5 grams of the 3-oxy-3-cyano-quinuclidine described in Example 1 are dissolved in 130 cc. of concentrated hydrochloric acid, and the solution is allowed to stand for 48 hours at room temperature. The solution is completely evaporated in vacuo, the crystalline residue is mixed with 130 cc. of absolute methanol saturated with hydrogen chloride at 0° C., and the mixture is allowed to stand for 48 hours at about 20° C. with occasional agitation. By evaporating the mixture the hydrochloride of 3-oxy-3-carbomethoxy-quinuclidine is obtained.

The latter salt can be obtained directly by treating the above cyanohydrin with aqueous methanolic hydrogen chloride in the manner described above.

In order to isolate the free ester-base the salt is mixed with an ice-cold concentrated solution of potassium carbonate, and the precipitated base is extracted with chloroform. The chloroform solution is dried over potassium carbonate and evaporated, whereby 8.9 grams of 3-oxy- 3-carbomethoxy-quinuclidine remain behind. The latter crystallises from a mixture of chloroform and pentane in the form of rosettes melting at 122° C., and yields by treatment with methyl iodide in acetone a methiodide melting at 191–192° C. The picrate of the base crystallises from ethanol in the form of yellow needles melting at 188–189° C. Its hydrochloride, when crystallised from acetone, forms prisms which unite into clusters and melt at 140–141° C.

By heating the 3-oxy-3-carbomethoxy-quinuclidine for a short time at 110–130° C., it is converted into the N-methyl-betaine of 3-oxy-quinuclidine-3-carboxylic acid, which can be crystallised from isopropanol.

This betaine, even after being dried in a high vacuum, contains 1 molecule of water of crystallisation, and it becomes discoloured above 255° C. and melts in a capillary tube at 278–281° C. with decomposition.

*Example 3*

8.8 grams of the 3-oxy-3-carbomethoxy-quinuclidine described in Example 2 are added in portions to 50 cc. of thionyl chloride cooled with ice, and the solution is then boiled under reflux for 48 hours. The resulting dark yellow solution is completely evaporated in vacuo, and the crystalline residue is taken up in hot acetone, boiled with a small amount of animal charcoal and filtered. By crystallisation carried out by concentrating the acetone solution 7 grams of the hydrochloride of the unsaturated ester are obtained in the form of colourless needles melting at 178–179° C.

By hydrolising the above unsaturated ester the corresponding acid is obtained. For this purpose a solution of 1.5 grams of 3-carbomethoxy-1-azabicyclo-(2:2:2)-oct-2-ene hydrochloride in 50 cc. of hydrochloric acid of 20 percent strength is boiled under reflux for 15 hours, and then the solution is evaporated in vacuo. By crystallising the residue from isopropanol there are obtained 1.2 grams of the hydrochloride of the free acid in the form of short colourless rods, which melt at 210–211° C. with decomposition.

*Example 4*

A solution of 6.4 grams of the 3-carbomethoxy-1-azabicyclo-(2:2:2)-oct-2-ene-hydrochloride described in Example 3 in 50 cc. of methanol is hydrogenated in the presence of 0.3 gram of platinum at room temperature and under ordinary pressure, the calculated quantity of hydrogen being absorbed.

The solution is filtered and evaporated, and the residue is recrystallised from acetone, whereby 6 grams of the saturated ester are obtained in the form of the slightly hygroscopic hydrochloride melting at 167–169° C. From the hydrochloride there can be obtained by treatment with picric acid in ethanol the picrate which crystallises in yellow needles melting at 155–156° C.

By hydrolysing the above ester quinuclidine-3-carboxylic acid is obtained. For this purpose 1.5 grams of the hydrochloride of 3-carbomethoxy-quinuclidine are boiled under reflux for 15 hours with 10 cc. of hydrochloric acid of 20 percent strength, and the solution is then evaporated. By triturating the residue with acetone 1.2 grams of the hydrochloride of 3-quinuclidine-carboxylic acid crystallise out. By recrystallisation from ethanol there are obtained small cubes melting at 273–275° C. The above described reduction can also be carried out with the same result in the presence of a palladium catalyst, such as palladium alone or palladium on a carrier, for example, palladium on active charcoal.

*Example 5*

10.0 grams of 3-oxy-3-cyano-quinuclidine are allowed to stand in 100 cc. of methanol saturated with hydrochloric acid for 24 hours at 20° C. and then boiled under reflux for 3 hours. The mixture is then evaporated under reduced pressure, the residue is dissolved in a little water, rendered strongly alkaline with concentrated potassium carbonate solution and extracted with chloroform. After being dried over potassium carbonate, the chloroform solution is evaporated and the residue crystallised from a mixture of chloroform and pentane. There is thus obtained 3-oxy-3-carbomethoxy-quinuclidine melting at 122° C. in the form of colourless crystals.

*Example 6*

3.3 grams of 3-quinuclidine-carboxylic acid hydrochloride are boiled under reflux with 33 cc. of thionyl chloride for 2½ hours. The solution is evaporated under reduced pressure and the crystalline residue is evaporated three times with 10 cc. of freshly added absolute benzene each time. The residue is dissolved in 20 cc. of absolute chloroform and dry $NH_3$ gas is introduced while cooling with water until the reaction is complete. The mixture is then evaporated under reduced pressure and the residue is extracted hot three times with 10 cc. of absolute ethanol each time. On evaporation, the extracts yield an oily residue which, when recrystallised from a mixture of ethanol and acetone, gives the crude hydrochloride of quinuclidine-3-carboxylic acid amide, melting at 198–211° C.

The base is liberated from the aqueous solution of its hydrochloride with concentrated $K_2CO_3$ and extracted with ample ethyl acetate. On working up in the usual manner, the ethyl acetate solution yields quinuclidine-3-carboxylic amide as colourless crystals which are readily soluble in water but sparingly soluble in ethyl acetate. When recrystallised from butanone, they melt at 196–199° C. after being dried in high vacuum.

A picrate is formed which when recrystallised from ethanol forms yellow needles melting at 192–194° C. By adding methanolic hydrochloric acid solution to the base, the hydrochloride can be obtained which, after crystallising from a mixture of ethanol and acetone, melts at 202–213° C.

What is claimed is:
1. 3-hydroxy-3-cyano-quinuclidine.
2. 3-hydroxy-quinuclidine-3-carboxylic acid.
3. 3-hydroxy-3-carbomethoxy-quinuclidine.
4. 3-carbomethoxy-1-aza-bicyclo-(2:2:2)-oct-2-ene.
5. 3-carbomethoxy-quinuclidine.
6. The hydrochloride of 3-carbomethoxy-quinuclidine.
7. Quinuclidine-3-carboxylic acid.
8. 3-hydroxy-3-carbo-lower alkoxy-quinuclidine.
9. 3 - carbo - lower alkoxy-1-aza-bicyclo-(2:2:2)-oct-2-ene.
10. 3-carbo-lower alkoxy-quinuclidine.
11. A member of the group consisting of quinuclidines of the formulae

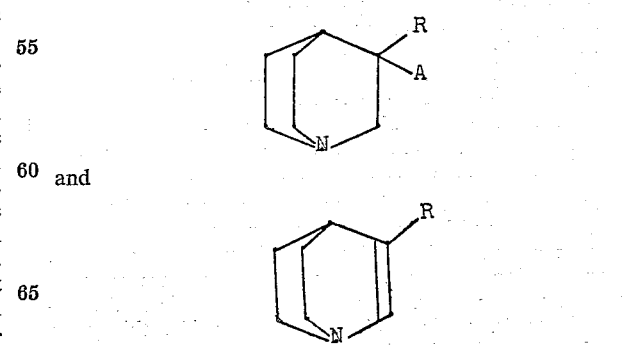

and in which formulae R stands for a member of the group consisting of carboxy and carbo-lower alkoxy and A represents a member of the group consisting of hydrogen and hydroxyl, therapeutically useful acid addition salts and lower alkyl quaternary ammonium compounds thereof.

12. 3-carboxy-1-aza-bicyclo-(2:2:2)-oct-2-ene.

13. The hydrochloride of quinuclidine-3-carboxylic acid amide.

References Cited in the file of this patent

Lukes et al.: Collection of Czechoslovak Chemical Communications, vol. 15, pp. 150–55 (1950), abstracted in Chem. Abst., vol. 45, col. 5693(b).

Rubtsov et al.: Doklady Akademii Nauk Soyuza Sovetskikh Sotsialisticheskikh Respublik, vol. 88, pp. 843–4 (1953), abstracted in Chemical Abst., vol. 48, col. 3975(g).

Prelog et al.: Annalen, vol. 532, pp. 83–8 (1937), abstracted in Chem. Abst., vol. 32, col. 166(2).

Prelog et al.: Annalen, vol. 545, pp. 259–62 (1940), abstracted in Chem. Abst., vol. 35, col. 457(6).